Jan. 13, 1959

Q. W. SIMKINS 2,869,034

PULSE COUNTING DEVICE

Filed March 19, 1953

INVENTOR
Q. W. SIMKINS
BY C. Mathie
ATTORNEY 2,869,034

PULSE COUNTING DEVICE

Quinton W. Simkins, Chatham Township, Morris County, N. J., assignor to Bell Telephone Laboratories, Incorporated, New York, N. Y., a corporation of New York Application March 19, 1953, Serial No. 343,285

5 Claims. (Cl. 315—84.5)

Figures 1, 2:
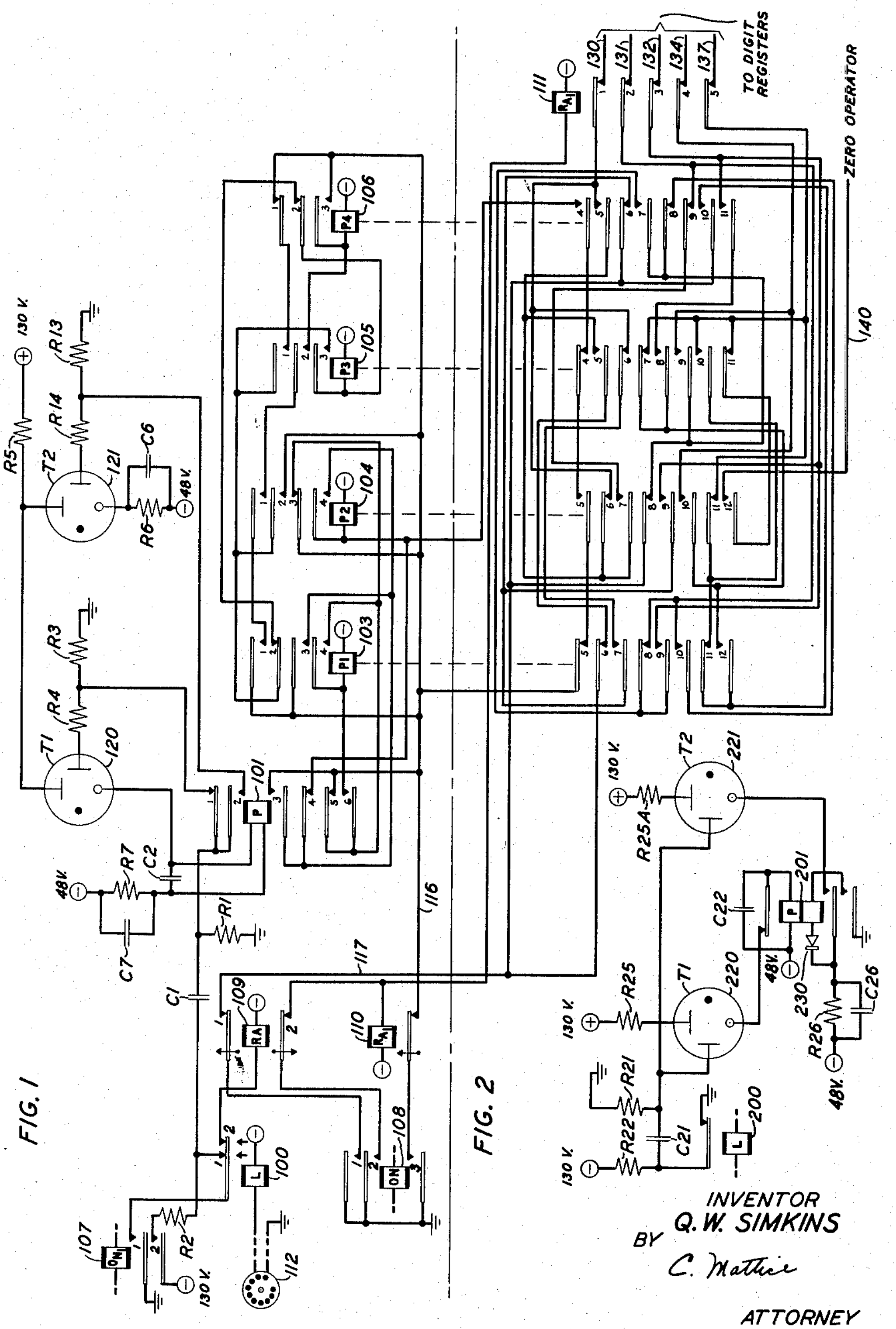

This invention relates to telephone systems and more particularly to means for receiving and counting dial pulses for the purpose of controlling the automatic estalishment of telephone connections.

In the copending application of J. W. Dehn, Serial No. 269,815, filed February 4, 1952, which issued as Patent No. 2,676,313 on April 20, 1954, is disclosed a counting relay arrangement for counting the ten pulses as generated by a telephone subscriber's dial and also for indicating a normal and an overflow condition. This arrangement employs six relays having only simple make and break contacts and is made up of two binary counters and two marking relays, one binary counter and the two marking relays being operated in various combinations to register the number of pulses received, while the other binary counter responds once per pulse and drives the actual counter.

The present invention relates to an electronic binary counter suitable for use in place of the driving binary counter of the above-mentioned Dehn application. A feature of the invention lies in the use of a pair of electronic tubes with means for rendering the tubes alternately responsive to the incoming pulses.

More specifically the invention relates to a binary pulse counter comprising two gas-filled tubes with a pulse dividing relay in the output circuit of one of the tubes, this relay when normal directing the pulse controlled circuit to the first tube, and operating, when the first tube is made conducting by a pulse, to extend the pulse controlled circuit to the second tube. When the second tube breaks down in response to a second pulse the first tube is quenched and the pulse dividing relay releases.

The invention will be more clearly understood from a consideration of the following description in connection with the attached drawing in which:

Fig. 1 shows the complete counting arrangement as it might be employed in an originating register such as used in the cross bar system disclosed in Patent 2,585,904 to A. J. Busch, granted February 19, 1952; and Fig. 2 shows an alternative form of electronic pulse divider.

In the drawing, relay 100 is a pulse receiving relay, while relay 101 is the pulse dividing relay operated under the control of the electron tubes 120 and 121. Relays 103 and 104 constitute a binary counter and relays 105 and 106 are a pair of marking relays. In addition, two off-normal relays 107 and 108 and three registration advance relays 109, 110 and 111 are shown which are standard parts of the cross bar system of the above-mentioned Busch patent.

In such a telephone system the origination of a call by a subscriber causes the automatic establishment of a connection between the calling subscriber's line and the pulse receiving relay 100 in the originating register, including the dial 112 at the calling substation. As a part of setting up this connection, off-normal relays 107 and 108 are operated. With off-normal relay 108 operated a circuit is closed over its contact 2, contact 2 of relay 109 to battery through the windings of relays 110 and 111, operating the latter relays. Relay 100 operates as soon as it is connected with the calling line.

The electronic binary counter comprises tubes 120 and 121 each having a control anode, a main anode and a cathode. The main anodes of tubes 120 and 121 are connected in parallel to plus 130-volt battery through resistance R5. The control anode of tube 120 is connected to ground through resistances R3 and R4, the point between resistances R4 and R3 being connected over contact 1 of relay 101 to the pulse controlled circuit. The control anode of tube 121 is also connected to ground through a pair of resistances R13 and R14 which have similar values to those of resistances R3 and R4. The point between resistances R13 and R14 is connected to contact 2 of relay 101 so that, with relay 101 operated, the pulse controlled circuit will be extended to the control anode of tube 121. The cathode of tube 120 is connected through the winding of relay 101 to battery through a network including resistance R7 and condenser C7, with condenser C2 connected across the winding of relay 101. The cathode of tube 121 extends to battery through a network including resistance R6 and condenser C6.

The pulse controlled circuit extends from minus 130-volt battery over contact 2 of off-normal relay 107 through resistance R2 and condenser C1 to ground through resistance R1, the point between condenser C1 and resistance R1 being connected to armatures 1 and 2 of relay 101. With relay 101 normal, condenser C1 charges through resistances R1 and R3 in parallel but this charging current is in such a direction that it has no effect upon tube 120.

The circuit remains in this condition until the subscriber operates his dial. As the dial returns to normal, it opens the circuit of relay 100 a plurality of times in the well-known manner. At the first release of relay 100, a circuit is closed from ground over the contact 1 of relay 107, contact 2 of relay 100 to battery through the winding of relay 109. This relay operates quickly but is slow to release so that it remains operated throughout the reception of each digit. At its contact 2, it opens the circuit of relays 110 and 111 so that these relays release and remain released throughout the reception of the digit.

When relay 100 releases in response to the first pulse, ground is connected over contact 1 of relay 107 and contact 1 of relay 100 to condenser C1, raising the potential on this side of condenser C1 from −130 volts to ground, and condenser C1 discharges. The current flow through resistance R3 as a result of this discharge creates a potential on the control anode of tube 120 which causes the control gap to break down, followed by the main gap, which causes relay 101 to operate. With relay 101 operated, the pulse controlled circuit is extended over contact 2 of relay 101 to resistances R13 and R14. However, the constants of relay 101, condenser C1 and resistances R1 and R3 are so selected that when relay 101 operates there will not be sufficient residual charge on condenser C1 to cause tube 121 to break down and conduct.

When relay 100 reoperates at the end of the pulse, condenser C1 is again charged but, as in the case of tube 120, the direction of the charging current is such that tube 121 is not affected thereby. When relay 100 releases in response to the second dial pulse, condenser C1 discharges through resistances R1 and R13 creating a potential on the control anode of tube 121 which causes the control gap to break down followed by the main gap.

With both tubes 120 and 121 drawing current through resistance R5 the potential at the main anodes of the two tubes drops below the sustaining voltage and tube 120 is extinguished, causing relay 101 to release and restore the connection between the pulse controlled circuit and the control anode of tube 120. As above-mentioned, the circuits are so designed that, when relay 101 releases, there will not be sufficient residual charge on condenser C1 to break down tube 120. When tube 120 breaks down as a result of the third pulse, tube 121 is extinguished.

From the foregoing it will be apparent that, following each odd numbered pulse, relay 101 remains operated and following each even numbered pulse, relay 101 is released.

With relay 101 operated following the first pulse, a circuit is closed from ground over contact 3 of relay 108, contact of relay 110, conductor 116, contact 3 of relay 104, contact 6 of relay 101 to battery through the winding of relay 103. Relay 103 operates and locks over its contact 4 and contact 3 of relay 104 to ground on conductor 116.

With relay 101 released following the second pulse, a supplementary locking circuit is closed for relay 103 over contact 4 of relay 103 and contact 5 of relay 101 to ground on conductor 116. At the same time, a circuit is closed from ground on conductor 116, contact 3 of relay 103, contact 4 of relay 101 to battery through the winding of relay 104. Relay 104 operates in this circuit and locks over its contact 4 and contact 3 of relay 103 to ground on conductor 116. With relay 101 operated following the third pulse the locking circuit of relay 103 is opened and that relay releases, but relay 104 is held operated in a circuit from battery through its winding and over its contact 4, contact 3 of relay 101 to ground on conductor 116.

With relay 101 released following the fourth pulse, the holding circuit of relay 104 is opened and that relay releases and the relay binary counter is ready for reoperation. In the manner above described, relay 103 is operated following the fifth pulse and relay 104 is operated following the sixth pulse, while relay 103 is released following the seventh pulse and relay 104 is released following the eighth pulse. Similarly relay 103 is reoperated after the ninth pulse and relay 104 is reoperated after the tenth pulse. If a false eleventh pulse should be received, relay 101 would reoperate in response to that pulse, releasing relay 103.

The marking relays 105 and 106 are operated under the control of relays 103 and 104. With relay 104 operated and relay 103 released after the third pulse, a circuit is closed from battery through the winding of relay 105, contact 2 of relay 106, contact 2 of relay 103, contact 2 of relay 104 to ground on conductor 116. Relay 105 operates in this circuit and locks over its contacts 3 and 1 and contact 1 of relay 106 to ground on conductor 116. An additional locking circuit is closed from battery through the winding of relay 105, contact 3 of relay 105, contact 2 of relay 104 to ground on conductor 116.

With relays 103 and 104 operated after the sixth pulse, a circuit is closed from ground on conductor 116, contact 1 of relay 103, contact 1 of relay 104, contact 2 of relay 105 to battery through the winding of relay 106. Relay 106 operates in this circuit locking over its contact 3 directly to ground on conductor 116. Relay 106 opens one locking circuit for relay 105 but the latter relay is held operated under the control of relay 104 until the eighth pulse at which time both relays 104 and 105 release.

Whenever a digit ends, relay 100 remains operated for a sufficient time to permit relay 109 to release and reoperate relays 110 and 111. Following the release of relay 109, ground is connected over contact 1 of relay 108 and contact 1 of relay 109 to conductor 117 which is extended over contacts of relays 103 to 106 to conductors 130, 131, 132, 134 and 137 in accordance with the two-out-of-five code as shown in the subsequent table. Relays 110 and 111 are slow to operate and during their operate time, ground is extended over the normally closed contacts of relay 111 to the digit register. The normally closed contacts of relay 111 are included in these circuits so that, when the locking circuits for the operated counting relays are opened by the operation of relay 110 no false registration can take place if the counting relays do not release simultaneously.

The non-symmetrical operation of relays 105 and 106 provides twelve unique combinations of the relays 103, 104, 105 and 106. Ten of these combinations serve to distinguish one to ten dial pulses and the translating circuits over the contacts of relays 103, 104, 105 and 106 shown at the bottom of the figure grounds two out of the five conductors 130, 131, 132, 134 and 137 during the interdigital time to correspond to the dialed digit. With none of the relays operated, none of the registering conductors are grounded and none of them are connected to any other. If an eleventh pulse is received a circuit is immediately closed which holds relay 104 operated and results in a trouble indication by the originating register. When a digit 0 is received, in addition to the coded indication of a digit 0, a special circuit is closed to ground conductor 140 which may be used by the originating register in setting up a call to the zero operator, when zero is the first digit dialed.

Following is a table showing the relays operated and the conductors grounded for each digit dialed:

| Digit | Relays Operated | Conductors Grounded |
|---|---|---|
| 1 | 103 | 130, 131 |
| 2 | 103, 104 | 130, 132 |
| 3 | 104, 105 | 131, 132 |
| 4 | 105 | 130, 134 |
| 5 | 103, 105 | 131, 134 |
| 6 | 103, 104, 105, 106 | 132, 134 |
| 7 | 104, 105, 106 | 130, 137 |
| 8 | 106 | 131, 137 |
| 9 | 103, 106 | 132, 137 |
| 10 | 103, 104, 106 | 134, 137 |
| 11 | 104, 106 | ---------- |

In the binary counter of Fig. 2 the pulse controlled circuit, which is essentially the same as that of Fig. 1, is connected directly to the control anodes of tubes 220 and 221. The main anodes of the two tubes are connected through individual resistances to +130 volt battery. The cathode of tube 220 is connected over contact 1 of relay 201 to −48 volt battery through the winding of that relay, in parallel with condenser C22, while the cathode of tube 221 is connected to normally opened contact 2 of relay 201. When relay 200 releases in response to a pulse, condenser C21 discharges, providing a sufficient potential to break down the control gap of tube 220. The main gap of tube 220 breaks down, causing the operation of relay 201. Neither gap in tube 221 breaks down since the cathode circuit of tube 221 is open at contact 2 of relay 201. Relay 201 closes a locking circuit for itself from −48 volt battery through the network including resistance R26 and condenser C26, rectifier 230, lower winding of relay 201 to ground at contact 3 of relay 201. Relay 201, at its contact 1, disconnects its upper winding from the cathode of tube 220, thereby extinguishing tube 220. When relay 200 reoperates, the discharge path for condenser C21 is opened.

When condenser C21 discharges in response to the second dial pulse, the control gap of tube 221 now extends over contact 2 of relay 201 to −48 volt battery through the network including resistance R26 and condenser C26. When the main gap of tube 221 breaks down, the current flow through resistance R26 is such that insufficient current can flow through rectifier 230 to hold relay 201 operated, and relay 201 releases. The release of relay 201 opens the main gap circuit of tube 221 thereby quenching that tube. With relay 201 released, the cathode circuit of tube 220 is restored so that tube 220 responds to the next dial pulse.

The circuit of Fig. 2 has an advantage over that of Fig. 1 since the tubes are extinguished as soon as they have performed their function of operating or releasing relay 201 with the consequence that the life of the tubes would be considerably increased.

Relay 201 would also have a set of contacts similar to contacts 3 to 6 of relay 101 by which it would control a set of pulse counting relays.

What is claimed is:

1. In a pulse counting arrangement, a pulsing relay responsive to each pulse to be counted, two gas-filled tubes, each tube having an input circuit and an output circuit, means under the control of said pulsing relay to activate said input circuits, a pulse dividing relay in the output circuit of one of said tubes, and means under the control of said pulse dividing relay to render said tubes alternately responsive to the activation of said input circuits.

2. In a pulse counting arrangement, a normally operated pulsing relay released in response to each pulse to be counted, two gas-filled tubes, each tube having a control anode, a main anode and a cathode, a source of sustaining potential connected to said main anodes, a pulse dividing relay connected to the cathode of one of said tubes and a network connected to the cathode of the second of said tubes, a circuit controlled by each release of said pulsing relay to generate a breakdown potential, and means under the control of said pulse dividing relay to alternately connect said breakdown potential to the control anode of said first tube and to the control anode of said second tube.

3. In a pulse counting arrangement, a normally operated pulsing relay released in response to each pulse to be counted, two gas-filled tubes, each tube having a control anode, a main anode and a cathode, a source of sustaining potential connected through a common resistance to said main anodes, a pulse dividing relay connected to the cathode of one of said tubes, a network connected to the cathode of the second of said tubes, and a circuit controlled by each release of said pulsing relay to generate a breakdown potential, said pulse dividing relay normally connecting said breakdown circuit to the control anode of said first tube whereby said pulse dividing relay operates as a result of the breakdown of said first tube in response to the first release of said pulsing relay, said pulse dividing relay when operated connecting said breakdown circuit to the control anode of said second tube whereby the next release of the pulsing relay causes the breakdown of said second tube, the current flow through said second tube and said network quenching said first tube and releasing said pulse dividing relay.

4. In a pulse counting arrangement, a normally operated pulsing relay released in response to each pulse to be counted, two gas-filled tubes, each tube having a control anode, a main anode and a cathode, a resistance, a source of potential connected through said resistance to the main anodes of both tubes normally supplying a sustaining potential at said anodes, a pulse dividing relay connected to the cathode of one of said tubes, a network connected to the cathode of the second of said tubes, and a circuit controlled by each release of said pulsing relay to generate a breakdown potential, said pulse dividing relay normally connecting said breakdown circuit to the control anode of said first tube whereby said pulse dividing relay operates as a result of the breakdown of said first tube in response to the first release of said pulsing relay, said pulse dividing relay when operated connecting said breakdown circuit to the control anode of said second tube whereby the next release of the pulsing relay causes the breakdown of said second tube, the current flow through said second tube and said network reducing the potential on said main anodes below the sustaining value so that said first tube is quenched and said pulse dividing relay is released to restore the connection of said breakdown circuit to said first tube.

5. In a pulse counting arrangement, a normally operated pulsing relay released in response to each pulse to be counted, two gas-filled tubes, each tube having a control anode, a main anode and a cathode, a resistance, a source of potential connected through said resistance to the main anodes of both tubes normally supplying a sustaining potential at said anodes, a pulse dividing relay connected to the cathode of one of said tubes, a network connected to the cathode of the second of said tubes, a breakdown control circuit including a condenser, a circuit for normally charging said condenser, and means controlled by each release of said pulsing relay to discharge said condenser to generate a breakdown potential, said pulse dividing relay normally connecting said breakdown circuit to the control anode of said first tube whereby said pulse dividing relay operates as a result of the breakdown of said first tube in response to the first release of said pulsing relay, said pulse dividing relay when operated connecting said breakdown circuit to the control anode of said second tube whereby the next release of the pulsing relay causes the breakdown of said second tube, the current flow through said second tube and said network reducing the potential on said main anodes below the sustaining value so that said first tube is quenched and said pulse dividing relay is released to restore the connection of said breakdown circuit to said first tube.

References Cited in the file of this patent

UNITED STATES PATENTS

| | | |
|---|---|---|
| 2,234,690 | Depp | Mar. 11, 1941 |
| 2,277,579 | Burger et al. | Mar. 24, 1942 |
| 2,576,099 | Bray | Nov. 27, 1951 |
| 2,649,502 | Odell | Aug. 18, 1953 |
| 2,649,580 | Dunn | Aug. 18, 1953 |
| 2,651,006 | Mederos | Sept. 1, 1953 |